United States Patent [19]

Schwartz

[11] Patent Number: 4,927,262
[45] Date of Patent: May 22, 1990

[54] MULTIPLE PUPIL PROJECTION DISPLAY

[75] Inventor: Alfred Schwartz, Manhattan Beach, Calif.

[73] Assignee: Hughes Aircraft Company, Los Angeles, Calif.

[21] Appl. No.: 343,326

[22] Filed: Apr. 26, 1989

[51] Int. Cl.[5] .............................................. G03B 21/60
[52] U.S. Cl. ........................................ 353/13; 353/38; 353/82; 350/127; 350/452
[58] Field of Search .................. 353/14, 13, 12, 7, 11, 353/38, 82, 83, 94; 350/127, 129, 123, 452, 169

[56] References Cited

U.S. PATENT DOCUMENTS

| | | | |
|---|---|---|---|
| 2,207,835 | 7/1940 | Sukumlyn | 350/127 |
| 2,480,031 | 8/1949 | Kellogg | 350/127 |
| 2,726,573 | 12/1955 | Maloff | 350/127 |
| 2,800,054 | 7/1957 | Allison | 353/81 |
| 3,754,813 | 8/1973 | Delpalma et al. | 350/127 |

FOREIGN PATENT DOCUMENTS

| | | | |
|---|---|---|---|
| 0014132 | 1/1987 | Japan | 350/452 |
| 0242447 | 7/1969 | U.S.S.R. | 350/127 |

*Primary Examiner*—William A. Cuchlinski, Jr.
*Assistant Examiner*—William C. Dowling
*Attorney, Agent, or Firm*—Leonard A. Alkov; Wanda Denson-Low

[57] ABSTRACT

Multiple pupils (16, 18) are formed in a projection display by employment of a field lens (14) which has at least first and second interleaved Fresnel lens segments. The first set of segments has the equivalent surface of a first lens (34) and the second set of interleaved segments has the equivalent curvature of a second lens (36), with the segments being shaped to produce two exit pupils. More exit pupils, up to four without loss of resolution, can be provided by the interleaving of further lens shapes. A separate lens face (30) controls the other dimension of the exit pupils. The additional lens face may be a Fresnel lens on the opposite side of the same lens element.

20 Claims, 2 Drawing Sheets

MULTIPLE PUPIL PROJECTION DISPLAY

FIELD OF THE INVENTION

This invention is directed to a multiple pupil projection display which creates multiple exit pupils. This produces high brightness viewing pupils for two or more viewers.

BACKGROUND OF THE INVENTION

Display screens are viewable from a wide angle and may be simultaneously viewed by a large number of viewers. However, in order to provide an adequate level of display intensity, a considerable amount of illumination power must be employed. Higher visibility of displays is achieved by pupil-forming projection displays. The delivery of the illumination to a limited exit pupil provides a number of advantages, such as display brightness and low external visibility. The display brightness is achieved by directing the principal part of the illumination to the exit pupil, and the low external visibility is achieved in the same way. The low external visibility precludes others, outside of the exit pupil, from viewing the display. This provides both security of information and provides dark surroundings around the exit pupil.

The problem with such pupil-forming projection displays has been that they have been limited to a single user because of the single exit pupil provided by their design. It is desirable to achieve the advantages of projection displays without necessarily limiting the viewpoint to a single exit pupil.

SUMMARY OF THE INVENTION

In order to aid in the understanding of this invention, it can be stated in essentially summary form that it is directed to a multiple pupil projection display wherein a field lens system creates multiple exit pupils so as to provide high brightness viewing modes for plural viewers. Interleaved Fresnel field lenses are employed.

It is thus a purpose and advantage of this invention to provide a multiple pupil projection display wherein a field lens system provides high brightness viewing modes in each of a plurality of exit pupils.

It is another purpose and advantage of this invention to provide a field lens system incorporating interleaved Fresnel lenses to define two separate exit pupils for viewing a projection display.

It is a further purpose and advantage of this invention to provide the advantages of a projection display having a limited exit pupil to a utilization wherein two or more exit pupils are achieved so that two or more viewers can simultaneously view a projection display.

Other purposes and advantages of this invention will become apparent from a study of the following portion of this specification, the claims and the attached drawings.

DESCRIPTION OF THE PREFERRED EMBODIMENT

Figure 1:
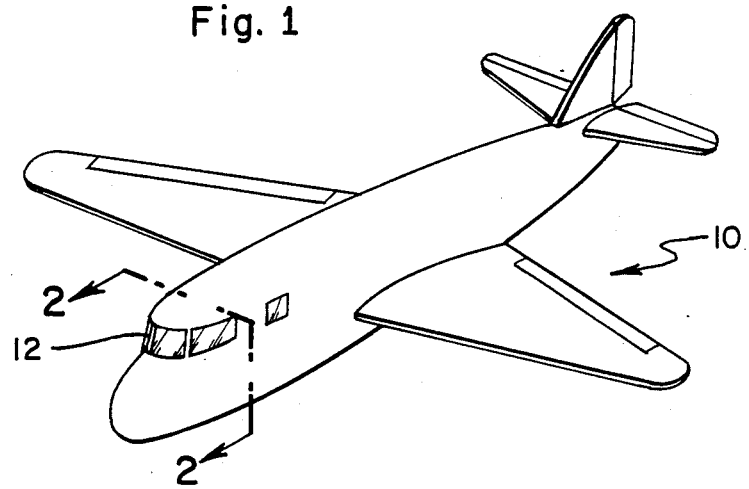
FIG. 1 is a perspective view of an airplane wherein the multiple pupil projection display of this invention is particularly useful.
Figure 2:
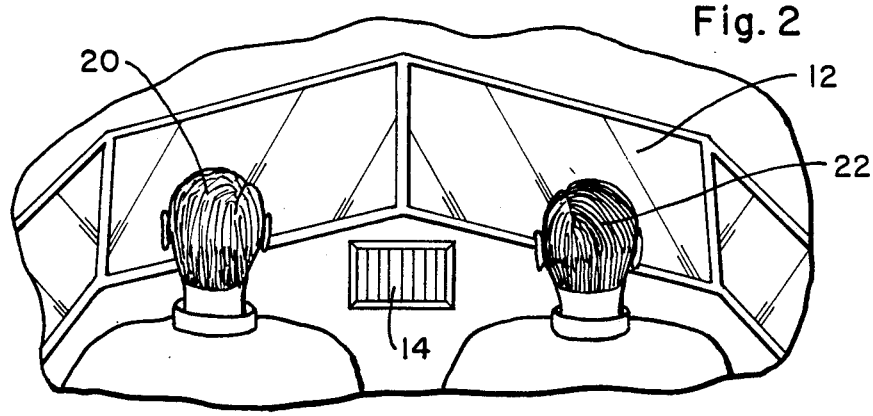
FIG. 2 is an enlarged view in an aircraft cockpit looking forward from the line 2—2 of FIG. 1 and with parts broken away.
Figure 3:
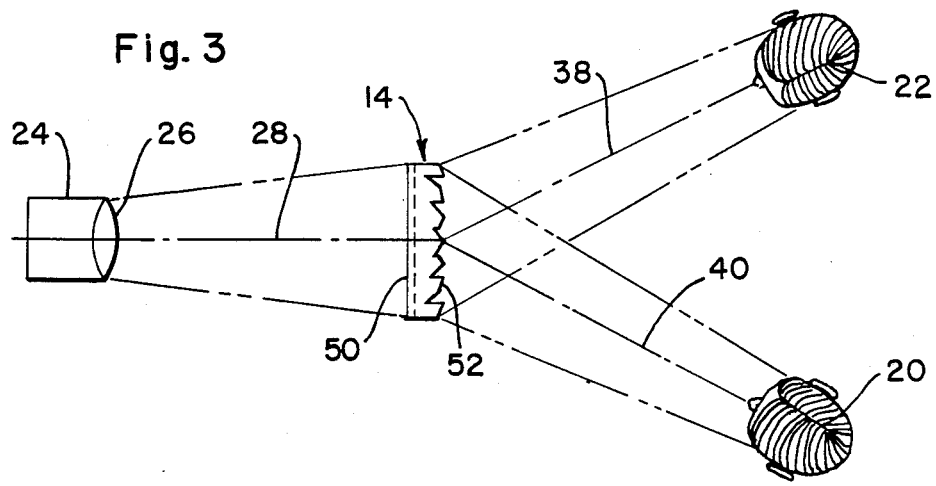
FIG. 3 is a plan view of the optical arrangement of the multiple pupil projection display.
Figure 4:
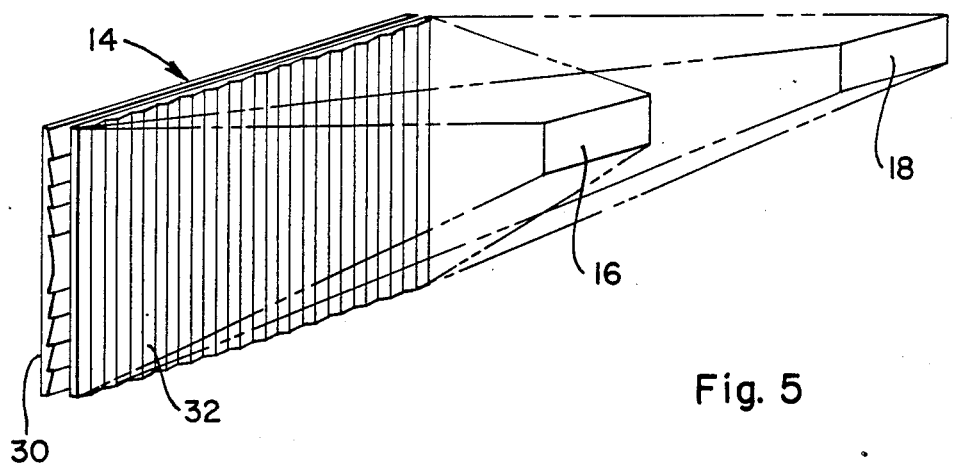
FIG. 4 is an isometric view of the interleaved Fresnel lens of the multiple pupil projection display showing the multiple pupils in dot-dash line.

As a particular utilization in which the multiple pupil projection display can be employed, an airplane 10 is illustrated as having a cockpit 12. The cockpit 12 has a projection display having a field lens 14 which provides two exit pupils 16 and 18, see FIG. 4. The two exit pupils are positioned in the normal eye location of the pilot 20 and copilot 22 of the aircraft. A projection display system for information useful to the pilot and/or copilot is indicated at 24 in FIG. 3. It has an objective lens 26 which projects the desired information. In the prior art, such an objective lens could be used to project the information display onto a ground glass where it is visible through the entire cockpit. However, with this spreading of the available illumination, the display brightness is poor. In accordance with this invention, the field lens 14 directs the information to the exit pupils or apertures 16 and 18. The optical axis of the objective lens is indicated at 28 in FIG. 3, and it intersects field lens 14. Field lens 14 has two interleaved Fresnel lens therein. The two lenses may be formed on opposite sides of the same part, or may be in separate parts. In FIG. 4, field lens 14 is shown as being formed of rear lens element 30 and front lens element 32. Any suitable optical material may be used.

Figure 5:
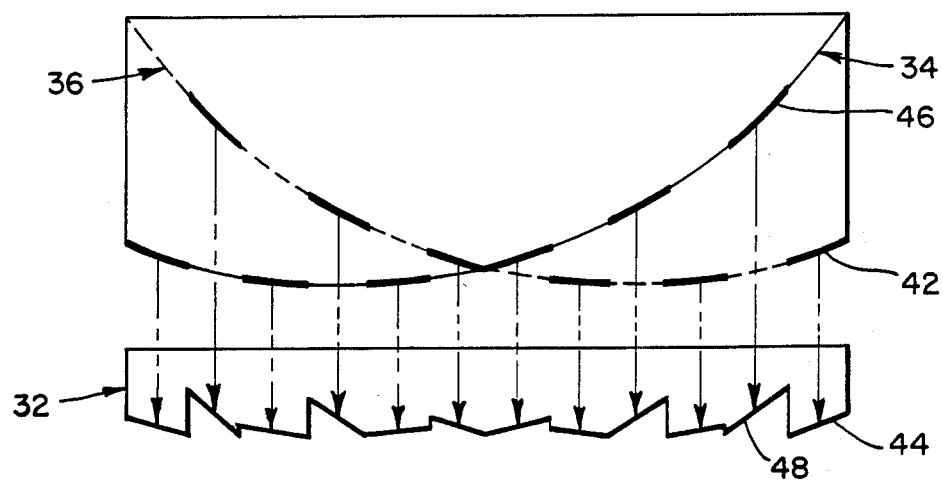
FIG. 5 is a plan view showing the manner in which a two cylindrical lenses are projected to become an interleaved Fresnel lens.

Both the rear and front lens elements are cylindrical Fresnel lenses. Considering the formation of front lens element 32, as shown in FIG. 5, it is formed of the equivalent of surfaces of right cylindrical lens 34 and surfaces of left cylindrical lens 36. These lenses are shaped to respectively direct the information from optical axis 28 to the right optical axis 38 or to the left optical axis 40. These lens surfaces 34 and 36 are design surfaces to illustrate the shapes involved and are not real lenses. The real lens 32 is formed of alternating segments of the right and left cylindrical lenses. For example, segment 42 is projected forward to become segment 44, and segment 46 is projected forward to become segment 48. This continues all the way across so that alternating segments of the Fresnel lens on the front surface of lens 32 are alternate parts of the two cylindrical lenses.

As shown, the width of the two pupils is the same, but the width of the two pupils may be different if different curvature is used in the two generating surfaces. In this way, the projected display is projected along both the objective axes 38 and 40, as seen in FIG. 3. This takes care of the width of both of the exit pupils 16 and 18. The height dimension of the exit pupil is controlled by the rear lens element 30. Since there is only one height requirement, the rear lens element 30 is a simple cylindrical Fresnel lens with some wedge shape to raise the objective axis, as shown in FIG. 4, and control the height of the exit pupils. Should there be a need to have exit pupils one over the other, the lens 30 could be an interleaved Fresnel lens with different curvature in adjacent lens segments, as described with respect to the lens 32.

In FIG. 4, the lenses 30 and 32 are shown as being separate lens elements, and the lens 32 is shown in more detail in FIG. 5. However, the two lens faces could be on opposite sides of the same lens body. This is shown in FIG. 3 wherein the lens face 50 is toward the display system 24 and is in the form of a wedge-shaped cylindrical Fresnel lens of the same optical characteristics as lens 30. The rear lens face 52 is an interleaved two-curvature Fresnel lens on a vertical axis.

Figure 6:
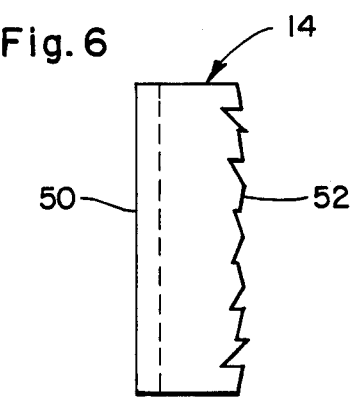
FIG. 6 is a plan view of another embodiment of the interleaved Fresnel lens.

FIG. 6 is an enlarged plan view of the lens shown in FIG. 3 where both lens faces are on opposite faces of the same lens element. Both the faces could be applied to the same side of the lens element, except for the difficulty in forming the individual segments. For example, if one was a horizontal cylindrical Fresnel and the other a pair of interleaved vertical cylindrical Fresnels, the result would be small rectangular lens elements adjoining each other in such a way that the active part of the Fresnel lens grooves would be reduced. This structure would also produce more stray light from the transition walls so as to reduce image contrast. For this reason, it is desirable to have the front and rear lens faces on separate lens elements, as shown in FIG. 4, or on opposite sides of the same lens element, as shown in FIGS. 3 and 6.

In order for the Fresnel lenses not to interfere with display resolution, each individual sequence of interleaved segments should not subtend more than two minutes of arc at the eye. This amounts to about 0.016 inch in segment width for a viewing distance of 28 inches. This represents sixty-one sequences per inch. The present state of the art in Fresnel lens fabrication produces high quality lenses at about 250 grooves per inch. Thus, for two exit apertures, no display resolution is lost. Furthermore, should more than two exit apertures be desired, the elements of more than two cylindrical lens can be interleaved. Without loss of resolution, strips of four different cylindrical lenses can be interleaved to produce four exit pupils without loss in display resolution.

The Fresnel lens 30 controls one dimension of the exit aperture without producing multiple apertures in that direction. A Fresnel lens need not be employed at that location, but a simple curved lens could be employed.

If one of the Fresnel lens interleaved series is replaced with matte surfaces, a lower brightness image is produced, but the image is observable from a wide angle range of positions the same way as a ground glass image.

By the use of a field lens with interleaved cylindrical Fresnel segments, a plurality of high visibility pupil-forming projection displays are achieved. This is particularly useful in aircraft where both the pilot and copilot are provided with exit pupils. It is also applicable to automobile or other vehicles to provide both the driver and passenger with the displayed information. It is useful in many other applications where several observers who are in fairly fixed locations can be provided with high brightness viewing at each of the multiple exit pupils.

This invention has been described in its presently contemplated best mode, and it is clear that is is susceptible to numerous modifications, modes and embodiments within the ability of those skilled in the art and without the exercise of the inventive faculty. Accordingly, the scope of this invention is defined by the scope of the following claims.

What is claimed is:

1. A multiple pupil projection display comprising:
a display system for projecting information along an optical axis;
a field lens on said optical axis, said field lens being formed of at least first and second sets of Fresnel segments, said first set of Fresnel segments having curvature corresponding to the curvature of a first lens and said second set of Fresnel segments having curvature corresponding to the curvature of a second lens so that first and second exit pupils are formed.

2. The display of claim 1 wherein said first set is sufficiently different than the curvature of said second set so that two separate exit pupils are formed.

3. The display of claim 2 wherein said first and second sets of segments have at least a portion of their curvature respectively around first and second cylindrical axes.

4. The display of claim 3 wherein an additional lens face is provided, said additional lens face being shaped to control the size of said first and second pupils in a direction at an angle to the direction between said pupils.

5. The display of claim 4 wherein said second lens face is a Fresnel lens face.

6. The display of claim 4 wherein said second lens face is a cylindrical lens face and wherein said first and second Fresnel lens segments are cylindrical lens segments.

7. The display of claim 6 wherein said interleaved Fresnel lens segments and said additional lens face are on the same optical element.

8. The display of claim 7 wherein said display system includes an objective lens for projecting optical information along as optical axis.

9. A multiple pupil projection lens comprising:
a field lens element having a first face and a second face, said second face of said field lens element comprising at least first and second sets of Fresnel lens segments, said first set of Fresnel lens segments having the equivalent curvature of a first lens and said second set of Fresnel lens segments having the equivalent curvature of a second lens, said first and second Fresnel lens segments being shaped to form first and second exit pupils.

10. The lens of claim 9 wherein said first set of lens segments is at least partially cylindrical about a first axis and said second set of Fresnel lens segments is at least partially cylindrical about a second axis.

11. The lens of claim 10 wherein said cylindrical lens axes are parallel to each other.

12. The lens of claim 10 wherein said second face of said lens element is planar.

13. The lens of claim 10 further including a cylindrical lens face in association therewith having an axis at an angle to said first and second lens axes.

14. The lens of claim 13 wherein said additional lens face is on a separate lens element.

15. The lens of claim 13 wherein said additional lens face is on the same lens element.

16. The lens of claim 15 wherein each of said segments is formed so as to subtend no more than two minutes of arc at the exit pupil.

17. The lens of claim 9 wherein each of said segments is formed so as to subtend no more than two minutes of arc at the exit pupil.

18. The method of forming a multiple pupil field lens comprising the steps of:

forming on the first face of a lens a plurality of spaced Fresnel lens segments having curvature equivalent to a first lens surface; and forming on the same lens surface interleaved with the first segments a plurality of second segments each corresponding to the curvature of a second lens so that when illuminated the lens projects separate exit pupils.

19. The method of claim 18 wherein the second set of segments is formed so as to lie directly adjacent on at least one side of the first set of segments.

20. The method of claim 18 wherein each of the segments is formed so as to subtend no more than two minutes of arc at the exit pupil.

* * * * *